US012762790B2

(12) United States Patent
Leung et al.

(10) Patent No.: US 12,762,790 B2
(45) Date of Patent: Oct. 13, 2026

(54) RENDERING METHOD AND SYSTEM

(71) Applicant: Sony Interactive Entertainment Inc., Tokyo (JP)

(72) Inventors: Jun Yen Leung, London (GB); Maurizio Cerrato, London (GB); Lawrence Green, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 99 days.

(21) Appl. No.: 18/784,989

(22) Filed: Jul. 26, 2024

(65) Prior Publication Data

US 2025/0061646 A1 Feb. 20, 2025

(30) Foreign Application Priority Data

Aug. 18, 2023 (GB) ..................................... 2312638

(51) Int. Cl.
*G06T 15/50* (2011.01)
*G06T 7/20* (2017.01)
*G06T 7/60* (2017.01)

(52) U.S. Cl.
CPC .............. *G06T 15/506* (2013.01); *G06T 7/20* (2013.01); *G06T 7/60* (2013.01)

(58) Field of Classification Search
CPC ......... G06T 15/06; G06T 17/10; G06T 17/20; G06T 9/001
See application file for complete search history.

(56) References Cited

U.S. PATENT DOCUMENTS

| | | | | |
|---|---|---|---|---|
| 11,721,064 | B1 | 8/2023 | Aksoy | |
| 12,236,517 | B2 * | 2/2025 | Bradley | G06T 7/62 |
| 2021/0383599 | A1 | 12/2021 | Fursund et al. | |
| 2023/0076326 | A1 | 3/2023 | Xu | |
| 2023/0141027 | A1 | 5/2023 | Cerrato et al. | |

OTHER PUBLICATIONS

Combined Search and Examination Report for corresponding GB Application No. GB2312638.6, 5 pages, dated Feb. 9, 2024.
Extended European Search Report in European Appln. No. 24190673.4, mailed on Feb. 6, 2025, 9 pages.

* cited by examiner

*Primary Examiner* — Nelson M Rosario
(74) *Attorney, Agent, or Firm* — Fish & Richardson P.C.

(57) ABSTRACT

There is provided a method for rendering a virtual environment. The method comprises identifying one or more static elements in the virtual environment, determining, for a first frame having a first virtual camera position, a geometry of the static elements in the virtual environment, storing the geometry of the static elements for the first frame, determining, for a second frame having the first virtual camera position, a geometry of at least part of the virtual environment based, at least in part, on the stored geometry of the static elements for the first frame, and determining, for the second frame, lighting for the at least part of the virtual environment at least in part based on the geometry of the at least part of the virtual environment determined for the second frame, to render the at least part of the virtual environment.

14 Claims, 4 Drawing Sheets

RENDERING METHOD AND SYSTEM

BACKGROUND OF THE INVENTION

Field of the Invention

The present invention relates to a method and system for rendering a virtual environment.

Description of the Prior Art

Developers of content (such as video games) continuously strive to provide yet more realistic virtual environments. The quality of lighting effects often plays a key role in the perception of such environments by users and how realistic they appear to users.

However, the process of rendering, and in particular determining lighting for, a virtual environment is often complex and computationally expensive. For example, while light probes can provide an effective way to obtain realistic lighting effects in virtual environments, the process of generating or updating such light probes (which are typically provided in large numbers throughout the environment) can be excessively high and may require the use of computationally expensive and specialised hardware.

The present invention seeks to mitigate or alleviate these problems, and to provide more efficient rendering.

SUMMARY OF THE INVENTION

Various aspects and features of the present invention are defined in the appended claims and within the text of the accompanying description and include at least:

In a first aspect, a method for rendering a virtual environment is provided in accordance with claim 1.

In another aspect, a system for rendering a virtual environment is provided in accordance with claim 14.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A method and system for rendering a virtual environment are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a suitable system and/or platform for implementing the methods and techniques herein may be an entertainment device such as the Sony® PlayStation 5® videogame console.

Figure 1:
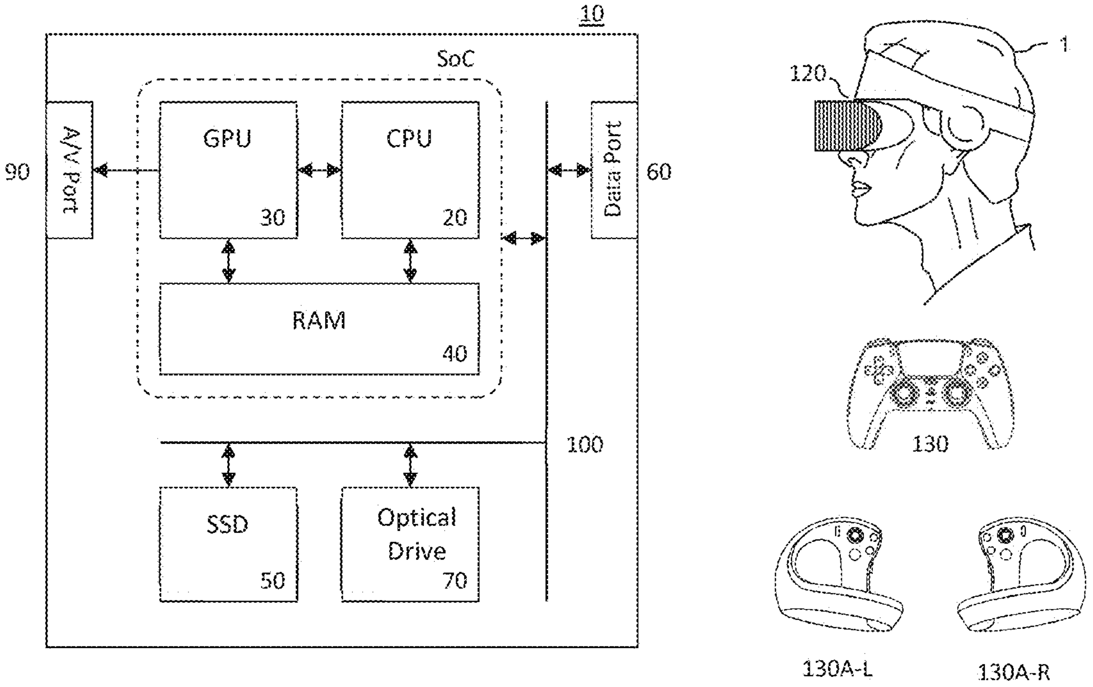
FIG. 1 schematically illustrates an entertainment device.

Referring now to the drawings, wherein like reference numerals designate identical or corresponding parts, FIG. 1 shows an example of an entertainment device 10 which is a computer or console such as the Sony® PlayStation 5® (PS5).

The entertainment device 10 comprises a central processor 20. This may be a single or multi core processor, for example comprising eight cores as in the PS5. The entertainment device also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Audio/visual outputs from the entertainment device are typically provided through one or more A/V ports 90, or through one or more of the wired or wireless data ports 60.

An example of a device for displaying images output by the entertainment device is a head mounted display 'HMD' 120, such as the PlayStation VR 2 'PSVR2', worn by a user 1. It will be appreciated that the content may be displayed using various other devices—e.g. using a conventional television display connected to A/V ports 90.

Where components are not integrated, they may be connected as appropriate either by a dedicated data link or via a bus 100.

Interaction with the system is typically provided using one or more handheld controllers 130, 130A, such as the DualSense® controller 130 in the case of the PS5, and/or one or more VR controllers 130A-L,R in the case of the HMD. The user typically interacts with the system, and any content displayed by, or virtual environment rendered by the system, by providing inputs via the handheld controllers 130, 130A. For example, when playing a game, the user may navigate around the game virtual environment by providing inputs using the handheld controllers 130, 130A.

In embodiments of the present disclosure, the entertainment device 10 generates one or more images of a virtual environment for display (e.g. via a television or the HMD 120).

The images generated by the entertainment device 10 are each associated with a virtual camera position. In other words, the entertainment device 10 is configured to output an image for display in dependence upon the position of the virtual camera.

It will be appreciated that a virtual camera has an associated viewpoint with respect to the virtual environment such that a portion of the virtual environment is included within the field of view of the virtual camera. This viewpoint is defined by a virtual camera position, which may include the location of the virtual camera in the virtual environment and an orientation of the virtual camera with respect to the virtual environment. In some cases, the virtual camera position may also include a magnification (e.g. zoom) of the virtual camera.

The virtual camera may follow a character in the virtual environment to thereby move with respect to the virtual environment. For example, the virtual camera may follow a non-player character (NPC) in a video game or may be controlled responsive to a user input to follow a player-controlled character. In some examples, the virtual camera may provide a first or third person viewpoint of a given character in a game. Alternatively, the virtual camera may have a fixed location in respect to the virtual environment and may be controlled responsive to an input from a spectator (non-playing user) to update an orientation of the virtual camera. Alternatively, the virtual camera may be controlled responsive to an input from a spectator to allow the spectator to change a position for the virtual camera with respect to the virtual environment without the spectator actively participating in a video game. Hence the position (e.g. a location and/or an orientation) of the virtual camera can be updated and the position of the virtual camera may optionally be controlled in response to a user input.

In some examples, the position of the virtual camera may correspond to tracked movements of the HMD 120 worn by a user so that the viewpoint for the virtual camera is updated according to the user's head movements. A location and/or orientation of an HMD can be tracked using one or more image sensors and/or one or more inertial sensors, such as an accelerometer, gyroscope and/or magnetometer. For example, known inside-out and/or outside-in tracking techniques using image sensors mounted on an HMD and/or mounted to capture images including an HMD can be used to track the location and orientation of the HMD. Therefore, in some cases the viewpoint for the virtual camera can be controlled by a user to move with respect to the virtual environment based on movement of an HMD.

Operating under suitable software instruction, the entertainment device or equivalent development kit, computer or server, may implement a method for rendering a virtual environment as described herein.

Embodiments of the present disclosure relate to rendering a virtual environment in two stages including a geometry stage where the geometry of the environment is determined, and a lighting stage where lighting for the environment is then determined based on the geometry. Embodiments of the present disclosure allow efficiently re-using rendering computations between frames by determining a geometry of static elements in the environment for a first frame and storing (e.g. caching) the result for future use, and then determining the geometry of the environment in a second (e.g. next or any other subsequent) frame, that has the same virtual camera position as the first frame, based on the stored geometry of static elements for the first frame. As the virtual camera position is unchanged between the frames, the static geometry for a previous frame can be effectively re-used in determining the geometry of the subsequent frame. This approach allows reducing the amount of computation required to render the environment over the course of multiple frames, and thus improving the efficiency of rendering the environment. A virtual environment may comprise a large number of static elements- and in some cases may mostly comprise static elements (e.g. in a video game). Further, the virtual environment is typically re-rendered at a high frequency (i.e. frame rate). Thus, by re-using the determined geometry of static elements between frames and thus improving the efficiency of rendering a plurality of frames, the present approach may provide considerable computational cost savings. In some cases, by increasing the rendering efficiency, the present disclosure can allow increasing the frame rate of the content thus further improving the immersiveness of the content for users.

As described in further detail below, the present approach is particularly applicable to the generation and updating of light probes. Light probes are often provided in large numbers in virtual environments and may require to be frequently updated (e.g. to reflect movement of objects in the environment or lighting changes). Light probes are also stationary and have fixed viewpoints, so the present approach can allow re-using a stored static geometry each time the light probe is updated thus reducing the computational cost of generating and updating the light probes.

The present approach is also applicable to the rendering of any other environment where the same virtual camera position may be used for multiple frames. For example, in various video games, such as sports (e.g. tennis or soccer) games the same virtual camera position may be used repeatedly over the course of the video game (e.g. a behind-court camera in tennis, or pitch side camera in soccer). Similarly, for various content, the virtual camera may often be stationary for periods of time—e.g. in video games users may often stop in a virtual environment for multiple frames to explore their surroundings in detail. Thus, by re-using geometry computations between frames, the present approach allows reducing the computational cost of rendering such environments.

Figure 2:
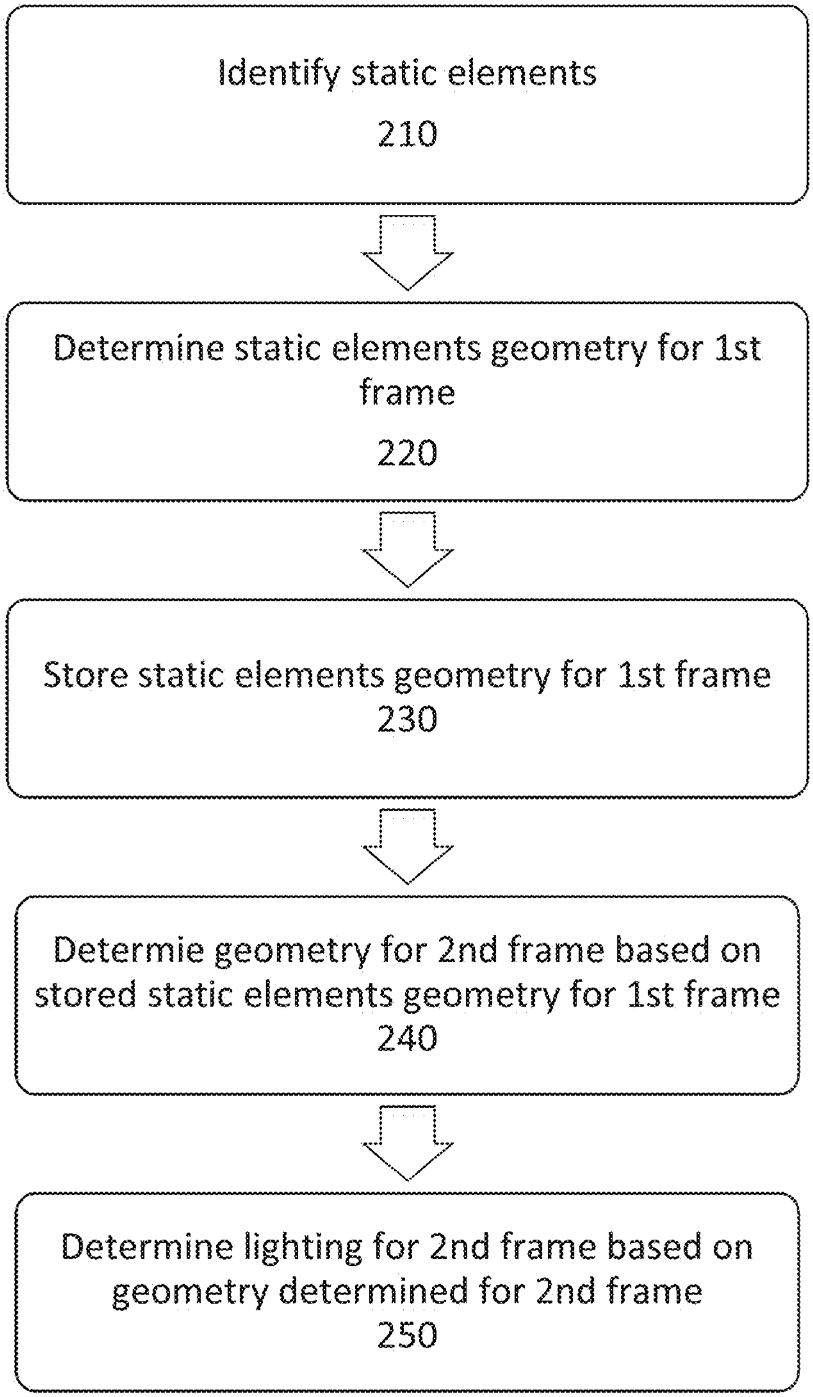
FIG. 2 is a schematic flowchart illustrating a method for rendering a virtual environment.

FIG. 2 shows an example of a method for rendering a virtual environment in accordance with one or more embodiments of the present disclosure.

A virtual environment for a content such as a video game typically includes a number of respective elements (i.e. graphical features).

It will be appreciated that the term "static elements" as used herein relates to elements in the virtual environment that are static (i.e. do not move) with respect to an origin or other reference point of the virtual environment. A static element may remain static during the execution of the rendering method, such as during a game session or a part (e.g. level) of a game or other content. Static elements may, for example, comprise the scenery of the virtual environment, and/or any other elements of the environment that do not move. Examples of static elements in a virtual environment include the ground (e.g. pavements, or roads), buildings, mountains, or trees; or parts thereof.

In contrast, it will be appreciated that the term "dynamic elements" relates to elements in the virtual environment that may move with respect to an origin or other reference point of the virtual environment. Examples of dynamic elements in a virtual environment include player characters, cars, or non-player characters (NPCs).

Referring back to FIG. 2, a step 210 comprises identifying one or more static elements in the virtual environment.

Static elements may be identified based on pre-defined properties associated with elements in the virtual environment. For example, a pre-defined flag may be assigned, e.g. by a developer or other user, to each element in the virtual environment to indicate whether the element is static or dynamic—e.g. a game developer may pre-set which elements in an environment are moveable and which are not. Static elements may then be identified based on the pre-defined flags for elements in the virtual environment.

Alternatively, or in addition, static elements may be identified by analysing movement of elements in the virtual environment over the course of a plurality of frames of the content. For instance, upon determining that an element has not moved during a predetermined number of frames, the element may be classified as static. The analysis of movement of elements may, for example, be based on a velocity buffer for pixels in each frame. For instance, elements with a zero velocity buffer during the predetermined number of frames may be considered static. The analysed frames may be in the same session (e.g. game session) of the rendered environment, and/or one or more historical sessions. In some cases, a pre-defined flag may be assigned to elements based on the analysis of movement, so that in subsequent sessions, the flag may be used to identify static elements as described above.

It will be appreciated that elements (whether static or dynamic) in the virtual environment may vary in size, and may each comprise one or more pixels.

It will also be appreciated that step 210 may comprise identifying all or only a subset of static elements present in the virtual environment. As discussed in further detail below, the geometry of static elements is stored at step 230. Thus, the amount of storage required can increase with the number (and/or geometrical complexity) of identified static elements; and in some cases it may be appropriate to identify (and store geometry for) only a subset of static elements in the virtual environment to reduce memory usage.

A step 220 comprises determining a geometry of the static elements in the virtual environment, for a first frame having a first virtual camera position.

Determining the geometry of the static elements may comprise rendering the static elements to determine geometry information for the static elements. The geometry information may be determined for each fragment of the static elements. The geometry information may comprise one or more of: position vectors, colour vectors, normal vectors, and/or specular values.

The geometry information may comprise depth information for the static elements from the viewpoint of the first virtual camera position. For example, the geometry information may comprise depth information corresponding to that typically stored in a Z-buffer. As described below, storing depth information for the static elements allows efficiently re-using the determined geometry of the static elements in subsequent frames.

In some cases, the geometry information may comprise information determined in a geometry stage of a deferred shading process for storage in a G-buffer. In some cases, determining the geometry of the static elements may comprise determining data required for pixel shading computation for the static elements. For example, the static elements may be rendered by rasterizing them into a texture map (also termed a texture buffer).

The first frame may relate to any frame of the content, with the term “first” merely indicating a distinction from a subsequent “second” frame. In some cases, the first frame may relate to a frame that is not displayed to any user, such as a loading frame—in other words, the geometry of the static elements may be determined (e.g. baked) prior to displaying the content to the user or to rendering the content for display to the user. For example, the geometry of the static elements may be determined on level load or asset baking of a video game.

It will be appreciated that at step 220 lighting for the static elements is typically not computed and that only geometry information is gathered. Omitting the typically more computationally expensive lighting computation may allow reducing computational resource usage. Further, as only static elements are rendered at step 220 and dynamic elements are omitted, lighting computed for static elements only may not be accurate for the virtual environment as a whole.

A step 230 comprises storing the geometry of the static elements for the first frame. In this way, the static elements geometry may be cached for future use in subsequent frames.

The static elements geometry may be stored in any appropriate type of storage device and/or in any number of storage devices. For example, when the method is executed by the entertainment device 10, the static elements geometry may be stored in the RAM 40 and/or disk 50. Alternatively, or in addition, the static elements geometry may be stored on one or more external devices, such as on a cloud server.

In some cases, the type of storage device used for storing the static elements geometry may be selected in dependence on one or more predetermined conditions, such as the frame rate of the content, or the amount of memory required to store the geometry. For example, faster access storage devices such as SRAM may be used where the frame rate is higher (and so the stored static elements geometry needs to be retrieved faster) and/or where the amount of memory required is lower; and cheaper but slower storage devices such as a disk may be used where the frame rate is lower or the amount of memory required is higher.

In some cases, the static elements geometry may initially be stored in a buffer (sometimes termed a G-buffer) for determining the lighting for the first frame. The static elements geometry may then be transferred from the buffer to a storage device for use in subsequent frames.

A step 240 comprises determining, for a second frame having the first virtual camera position, a geometry of at least part of the virtual environment based, at least in part, on the stored geometry of the static elements for the first frame. Re-using the stored static elements geometry for the first frame in this way allows improving the efficiency of determining the geometry for the second frame.

Determining the geometry of the virtual environment (or at least a part thereof) for the second frame may comprise determining a geometry of dynamic elements in the virtual environment for the second frame, and combining the stored geometry of the static elements for the first frame and the determined geometry of the dynamic elements for the second frame. Determining only the dynamic element geometry for the second frame and combining this with the stored static elements geometry for the first frame removes the need to repeatedly re-determine the geometry of the entire environment, and allows reducing the computational cost of determining the geometry for multiple frames.

One or more dynamic elements in the virtual environment may be identified using the techniques described with respect to identifying static elements at step 210, which may, for example, be applied in reverse to identify dynamic elements. For instance, dynamic elements may be identified based on pre-defined flags assigned to dynamic elements in the environment, and/or by analysing movement of elements in the virtual environment over the course of a plurality of frames of the content to identify elements that have moved to at least a predetermined degree.

Dynamic and static elements may be considered as complementary sets of elements in the virtual environment. In other words, any element not identified as static may be considered dynamic and vice versa. Thus, in some cases, dynamic elements may be identified as all elements that were not identified as static at step 210. It will be appreciated that likewise at step 210 static elements may be identified based on a previous identification of dynamic elements with static elements being the elements that were not identified as dynamic.

The geometry of the dynamic elements for the second frame may then be determined using the same techniques as described with reference to determining the geometry of static elements at step 220.

Once determined, the geometry of the dynamic elements for the second frame may be combined with the stored geometry of the static elements for the first frame. The geometries of the static and dynamic elements may be combined in dependence on the relative depth, from the first virtual camera position, of the static and dynamic elements. The relative depth of the elements may be determined based on the depth information (e.g. depth-buffers) determined as part of determining the elements' respective geometries. Based on the relative depth of the static and dynamic elements, parts of the elements that are occluded from the viewpoint of the virtual camera may be discarded to determine a combined geometry for the virtual environment.

Combining the static and dynamic elements' geometries may comprise creating a copy of the stored static geometry and writing the dynamic geometry on top of the copy of the static geometry in dependence on the relative depth of the static and dynamic elements, thus overwriting the copy with the determined geometry of the environment including both static and dynamic elements, while avoiding altering of the stored static geometry so that it can be used for further frames.

It will be appreciated that step 240 may comprise determining the geometry of part or all of the virtual environment for the second frame. Typically, the geometry of the part of the virtual environment within the viewpoint of the virtual camera for the second frame is determined. In some cases, further parts of the geometry may be determined for use in future frames, e.g. parts of the environment outside the virtual camera viewpoint may be pre-emptively rendered for quick access in future frames.

A step 250 comprises determining, for the second frame, lighting for the at least part of the virtual environment at least in part based on the geometry of the at least part of the virtual environment for the second frame determined at step 240, so as to render the at least part of the virtual environment.

In embodiments of the present disclosure, the virtual environment (or part thereof) is rendered in two stages comprising a first 'geometry' stage and a second 'lighting' stage. Step 240 relates to the first geometry stage, and step 250 relates to the second lighting stage.

Determining lighting for the second frame based on the geometry of the virtual environment determined at step 240 may comprise determining one or more output pixels (i.e. pixels for output to a display), and performing a lighting operation for each output pixel. The lighting operations may each comprise shading operations. The lighting operations may be performed by a pixel shader that determines the lighting (e.g. direct and/or indirect lighting) for each output pixel based on the determined geometry of the environment. Separating the rendering process into a geometry stage and a lighting stage allows improving the efficiency of rendering the environment as the geometry determined at step 240 provides information relating to fragments that will be provided as output pixels for display (e.g. determined based on depth information of the fragments) and thus lighting only needs to be determined once for each output pixel. The number of lighting operations may thus be reduced as compared to a forward rendering approach where geometry and lighting stages are not separated.

Of course, it will be appreciated that the techniques described herein can be extended to any number of frames. For example, the static elements geometry for the first frame can be re-used for determining the geometry of a plurality of subsequent frames with the same virtual camera position, thus providing further efficiency improvements.

Figure 3:
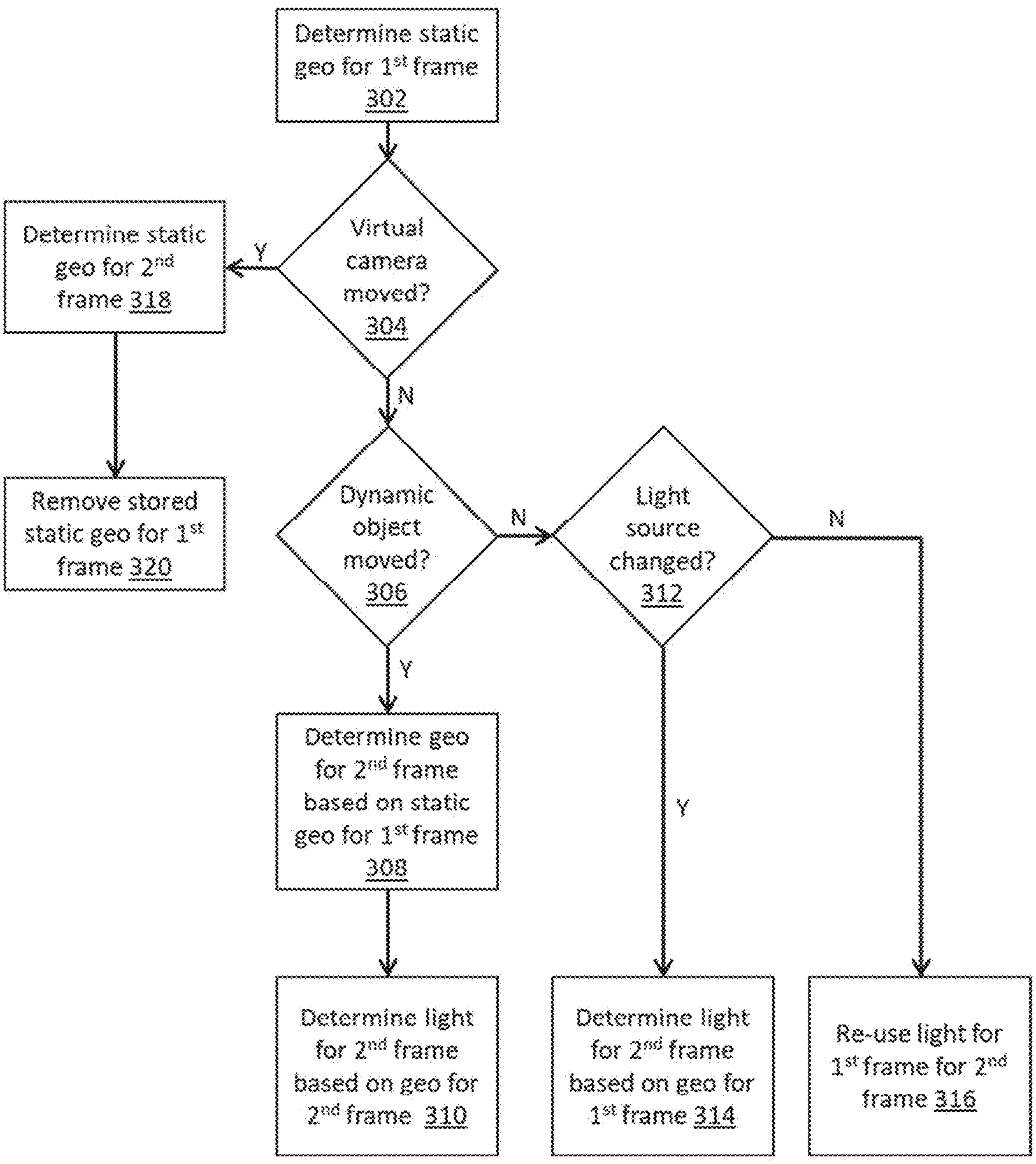
FIG. 3 is a schematic flowchart illustrating a further method for rendering a virtual environment.

FIG. 3 shows a further example method for rendering a virtual environment in accordance with one or more embodiments of the present disclosure.

A step 302 comprises determining and storing a geometry of one or more static elements in the virtual environment for a first frame having a first virtual camera position. The static elements may be identified, and their geometry determined, using the techniques described above with reference to steps 210-230 of the method of FIG. 2.

A step 304 comprises determining a virtual camera position of a second frame and detecting whether the virtual camera position has changed between the first frame and the second frame (i.e. whether the virtual camera has moved).

If, at step 304, it is determined that the virtual camera position is the same for the first frame and the second frame (i.e. the second frame has the same first virtual camera position), the method proceeds to step 306.

At step 306, movement, between the first frame and the second frame, of one or more dynamic elements in the virtual environment is detected. Dynamic elements and their movement may be detected using the techniques described above with reference to the method of FIG. 2, e.g. based on velocity buffers of pixels associated with elements of the virtual environment.

In some cases, step 306 may comprise detecting movement of dynamic elements that are within the at least part of the environment being rendered. For example, movement of dynamic elements that are within the field of view of the virtual camera of the second frame may be detected, while movement of dynamic elements outside the field of view may be ignored. As discussed in relation to step 314, the geometry of the environment determined for the first frame may be re-used for determining the lighting for the second frame if no movement of dynamic elements is detected at step 306. As dynamic elements outside the at least part of the environment do not affect the geometry of that part of the environment for the second frame, detecting movement of only dynamic elements that are within the at least part of the environment (e.g. within the field of view of the virtual camera) allows efficiently re-using the geometry from the first frame and further reducing the computational cost of rendering the environment.

It will be appreciated that the detection of movement of dynamic elements in step 306 may include the detection of the addition of new dynamic elements, removal of previous dynamic elements, and/or any other changes to the dynamic elements such as a change in their shape (e.g. damage to a car element in the virtual environment).

If, at step 306, a movement of at least one dynamic element between the first frame and the second frame is detected, the method proceeds to step 308.

At step 308, a geometry of at least part of the virtual environment is determined for the second frame based, at least in part, on the geometry of the static elements for the first frame determined and stored at step 302. The geometry of the environment for the second frame may be determined using the techniques described above with reference to step 240 of the method of FIG. 2.

At step 310, lighting for the at least part of the virtual environment is determined for the second frame at least in part based on the geometry for the second frame determined at step 308, so as to render the at least part of the virtual environment. The lighting for the environment for the second frame may be determined using the techniques described above with reference to step 250 of the method of FIG. 2.

It will thus be appreciated that steps 302-310 of the method of FIG. 3 may correspond to steps 210-250 of the method of FIG. 2. The various further steps of the method of FIG. 3 relate to further extensions to the rendering method that allow further increasing the efficiency of rendering the environment.

If, at step 306, no movement of the dynamic elements is detected between the first frame and the second frame, the method proceeds to step 312.

At step 312, changes to one or more light sources in the virtual environment between the first frame and the second frame are detected. Changes to light sources may include one or more of: addition of one or more light sources (i.e. addition of light sources in the second frame that were not present in the first frame), removal of one or more light sources (i.e. removal of light sources from the second frame that were present in the first frame), or changes to one or more characteristics of the light sources such as luminosity, colour or position in the virtual environment. Changes to light sources may, for example, be detected from an engine rendering the content (e.g. a game engine for video game content).

In cases where step 306 comprises detecting movement of only dynamic elements within the at least part of the environment (e.g. within the field of view of the virtual camera of the second frame), step 312 may comprise detecting both changes to light sources and movement of one or more other dynamic elements, such as dynamic elements outside the at least part of the environment or outside the field of view of the virtual camera of the second frame. As discussed in relation to step 316, the lighting of the environment determined for the first frame may be re-used for the second frame if no changes to lighting are detected at step 312. As movement of a dynamic element may affect lighting in the environment even if the element is outside the at least part of the environment (e.g. if the dynamic element is reflective), detecting movement of one or more other dynamic elements outside the at least part of the environment at step 312 helps ensure that lighting is not re-used between frames when it has in fact changed.

In some cases, step 312 may comprise detecting changes to a subset of light sources and/or a subset of dynamic elements in the virtual environment. These subsets may be selected based on one or more predetermined conditions. A subset of light sources and/or dynamic elements the changes to which are more likely to affect lighting in the environment for the second frame may be selected based on these predetermined conditions. Example predetermined conditions for selecting the subset of dynamic elements may include: a distance between the dynamic element and the virtual camera in the second frame (and/or between the dynamic element and a volume of the environment falling within the viewpoint of the virtual camera), one or more optical properties of the dynamic element such as its reflectivity, and a shape and/or size of the dynamic element. Example predetermined conditions for selecting the subset of light sources may include: a distance between the light source and the virtual camera in the second frame (and/or between the light source and a volume of the environment falling within the viewpoint of the virtual camera), a luminosity of the light source, a direction of the light source, a colour of the light source, and a light cone of the light source. For example, a subset of light sources that are within a predetermined distance of the virtual camera and point towards the virtual camera may be selected; or a subset of dynamic elements that have a reflectivity above a predetermined threshold may be selected. At step 312, changes to only light sources and/or dynamic elements within the selected subsets may be tracked (i.e. detected), and only such changes may trigger a re-computation of lighting at step 314. This allows reducing the number of lighting re-computations that may be required and thus allows improving the efficiency of the rendering method.

It will be appreciated that a light source may be a dynamic element (e.g. a light on a car, or the sun) or a static element (e.g. streetlights).

If, at step 312, a change to at least one light source between the first frame and the second frame is detected, the method proceeds to step 314.

At step 314, lighting for the second frame is determined based on geometry of the at least part of the virtual environment previously determined for the first frame. In other words, the geometry of the environment determined for the first frame is re-used for the second frame, which allows reducing the amount of computation required to render the second frame as the result of the geometry stage from the first frame can be re-used and only the lighting stage is required to account for a potential change to lighting caused by a change to light sources as detected at step 312. The lighting for the second frame may be determined based on the geometry of the first frame using the same techniques as those described in relation to step 310.

If, at step 312, no changes to light sources between the first frame and the second frame are detected, the method proceeds to step 316.

At step 316, instead of determining lighting anew for the second frame (as e.g. at steps 310 or 314), the lighting determined for the first frame is re-used for the second frame. In effect, the first frame is thus re-used for the second frame. In this way, the computationally expensive lighting determination is omitted for the second frame altogether and the efficiency of the rendering method is further improved. Any resultant reduction to quality or inaccuracy of the rendering is also reduced (or at best avoided) as it has already previously been determined that dynamic elements have not moved (at step 306) and that light sources have not changed (at step 312).

If, at step 304, it is determined that the virtual camera position has changed between the first frame and the second frame (i.e. the second frame has a, different, second virtual camera position), the method proceeds to step 318. For example, the virtual camera position may change upon movement of a player avatar by the user, or upon repositioning of a light probe by a developer.

A step 318 comprises determining and storing a geometry of the static elements in the virtual environment for the second frame. In other words, the geometry of the static elements is re-calculated for the second frame to account for movement of the virtual camera, so that the static elements geometry for the second frame can be re-used for subsequent frames, e.g. in the same manner as the static elements geometry for the first frame can be re-used for the second frame as described herein.

In some cases, step 318 may be performed in dependence on one or more predetermined conditions. The predetermined conditions may provide a measure of how likely it is that the second virtual camera position will be used in subsequent frames, so that static element geometry is only calculated and stored for frames whose virtual camera position is likely to be used by further frames. The predetermined conditions may, for example, relate to a proportion of static elements in the second frame, a frequency of the second virtual camera position amongst previous frames, or a user-defined flag. For example, the static elements geometry may be determined for the second frame only if the second virtual camera position has been used in a predetermined number of previous frames, comprises at least a predetermined number of static elements, and/or has been flagged as likely re-usable by a user (e.g. a game developer).

The static elements geometry for the first frame may be retained in storage independent of whether the virtual camera has moved, as further future frames may have the first virtual camera position and so would benefit from the stored static elements geometry for the first frame.

Alternatively, the method may proceed to step 320 after step 318. At step 320, the stored static elements geometry for the first frame is removed from storage to reduce memory usage. The geometry information for static elements in a frame may require a large amount of memory so flushing the static elements geometry cache in this way helps ensure that memory usage is not exceedingly high.

In some cases, the stored static elements geometry for the first frame may be removed from storage in dependence on one or more predetermined conditions. The predetermined conditions may provide a measure of how likely it is that the first virtual camera position will be used in subsequent frames. The predetermined conditions may, for example, relate to: a recency of the first frame (e.g. in the number of frames, or real or in-content (e.g. in-game) time), a frequency of the first virtual camera position amongst previous frames, a game associated with the virtual environment, or a flag assigned by a user (e.g. to indicate frequently re-used virtual camera positions). For example, the static elements geometry for the first frame may be removed from storage if the first frame is an old frame, or if the first frame (or its virtual camera position) is not flagged as frequently re-useable. Alternatively, or in addition, the static elements geometry for the first frame may be removed from storage if the first virtual camera position was used less than a predetermined number of times in previous frames.

It will be appreciated that the rendering method of FIG. 3 allows further reducing the computational cost of rendering the environment by efficiently re-using geometry and/or lighting computations between frames.

It will also be appreciated that various steps of the method of FIG. 3 may be optional. For instance, in some examples step 304 (i.e. determining whether the virtual camera has moved between the first frame and the second frame) and associated steps 318 and 320 may be omitted, and on the assumption that the virtual camera has not moved (which may e.g. be appropriate for light probes) the method may proceed directly from step 302 to step 306. Alternatively, or in addition, in some examples step 306 (i.e. determining whether dynamic objects have moved between the first frame and the second frame) and associated steps 312-316 may be omitted, and on the assumption that dynamic objects have moved the method may proceed directly from step 304 to steps 308 and 310. Alternatively, or in addition, in some examples, step 312 (i.e. determining whether light sources have changed between the first frame and the second frame) and associated step 316 may be omitted, and on the assumption that light sources have changed the method may proceed directly from step to step 306 to 314.

It will also be appreciated that the various steps of the methods of FIGS. 2 and 3 may be performed in any appropriate combination.

The rendering methods of FIG. 2 and/or of FIG. 3 may comprise various further steps. These further steps may include one or more of: selecting a frame as the first frame in dependence on one or more predetermined conditions; and identifying and re-using the geometry of elements in the virtual environment that are fixed relative to the virtual camera (also referred to as "fixed elements").

Considering selecting the first frame, a frame may be selected amongst a plurality of frames of the content as the first frame in dependence on one or more predetermined conditions. The predetermined conditions may be similar to those described with reference to determining whether to compute the static elements geometry for the second frame at step 318. For instance, the first frame may be selected in dependence on a proportion of static elements in each frame, and/or a distribution of virtual camera positions amongst the plurality of frames. The first frame may, for example, be selected as the frame whose virtual camera position is used most frequently amongst the plurality of frames. The proportion of static elements in the frame may also be taken into account in selecting the first frame, e.g. to select a frame that has a higher proportion of static elements (and so more of the geometry computations can be re-used between frames). Alternatively, frames with a lower proportion of static elements may be prioritised to reduce the amount of memory required to store the determined geometry for the static elements.

In some cases, virtual camera positions can be tracked over the course of multiple frames (e.g. using counters) to determine how frequently each virtual camera position is repeated. The static elements geometry may then be determined based on this tracking—for example, the static elements geometry may be determined and stored for any frame whose corresponding virtual camera position has been repeated at least a predetermined number of times. This allows caching static elements geometry for a plurality of frequently re-used virtual camera positions, thus further reducing the computational costs of rendering a plurality of frames. In some cases, the selection of the first frame may be performed in dependence on an analysis of user behaviour and virtual camera positions in a plurality of previous sessions of the content, e.g. to identify the most frequent virtual camera positions.

Considering fixed elements, the term "fixed element" may relate to an element that is fixed (i.e. has substantially the same position) relative to a virtual camera irrespective of the position of the virtual camera. A fixed element may be static but is typically dynamic—in other words, a fixed element typically moves with respect to the origin of the virtual environment but is fixed relative to the virtual camera. Examples of such fixed elements may include: an avatar hand when the viewpoint corresponds to a first person view, a portion of an avatar when the viewpoint corresponds to a third person view, a portion of a helmet when the viewpoint corresponds to a first person view, or one or more parts of a user's car in a driving game. For instance, an element such as a helmet worn by an in-game character or a weapon held by an in-game character, may be included in an image frame that is output for display such that a position of the helmet or weapon in the image frame remains unchanged regardless of changes in the location and/or orientation of the viewpoint of the virtual camera. For example, in some first person shooter games, a virtual helmet or other similar structure can be included in an image frame to provide a viewer the impression of viewing the scene as though they are wearing a helmet and as such the position and appearance of the helmet remains unchanged for a series of image frames generated for the virtual camera even though the virtual camera moves with respect to the virtual environment.

In some cases, the rendering method of FIGS. 2 and/or 3 may comprise identifying one or more fixed elements in the virtual environment, determining and storing, for the first frame, a geometry of the fixed elements in the virtual environment, and determining the geometry for the second frame at least partly based on the stored geometry of the fixed elements for the first frame.

Fixed elements in the virtual environment may, for example, be identified based on a pre-selection by a user (e.g. a game developer may mark fixed elements in the environment), or based on content changes between a plurality of frames (e.g. where pixels appearing in the same location for a predetermined number of frames may be determined as fixed). The geometry of the fixed elements for the first frame may then be determined and stored using similar techniques to those described with reference to steps 220, 230 of the method of FIG. 2. Subsequently, the geometry for the second frame may be determined using the stored fixed elements geometry for the first frame using similar techniques to those described with reference to step 240 of the method of FIG. 2. For example, the fixed elements geometry for the first frame may be combined with the dynamic elements geometry for the second frame and/or with the static elements geometry for the first frame, to more efficiently determine the environment geometry for the second frame. Fixed elements typically are typically arranged in proximity to the virtual camera and occlude other elements so re-using fixed elements geometry in this way can further reduce computational costs of the rendering process.

In some cases, fixed elements geometry for the first frame may be used to determine the geometry for the second frame even when the second frame has a different virtual camera position than the first frame, as the fixed elements are static relative to all virtual camera positions.

As noted above, the present disclosure may be particularly applicable to the generation and updating of light probes.

It will be appreciated that a typical virtual environment, which may be for use in content such as a video game, or as a TV or movie set, may comprise ambient light (for example generated by a so-called sky box) and/or directional light (typically from in-environment light sources).

A further form of lighting comes from global illumination ('GI'), which accounts for secondary light sources such as bounced or reflective light, or optionally emissive light from textured objects. Similarly reflection can redirect light toward other surfaces and toward the virtual camera.

The calculation of such secondary light can be performed using global illumination probes ('GI probes') and optionally also reflection probes, which collectively may be more generally referred to as light probes.

Light probes provide a way to capture information about light passing through empty space in the virtual environment (e.g. in a space between buildings). In other words, light probes may be considered a texture that captures lighting information about the virtual environment around them. This information may be stored in the light probe to illuminate objects in the environment at runtime of the content (e.g. a video game). For example, several light probes may be placed throughout a virtual environment, and the light probes may be used to provide lighting effects on moving objects (e.g. a car in between the buildings) in the virtual environment—e.g. lighting effects on a moving object may be approximated by interpolating between light probes adjacent to the object.

The lighting information for a light probe may be captured once before runtime (e.g. baked) and used throughout runtime of the content. Such light probes are sometimes referred to as static, or baked, light probes.

Alternatively, the lighting information for a light probe may be updated to react in real-time to changes in the virtual environment around them. Such light probes are sometimes referred to as dynamic, real-time, or non-baked light probes. Using dynamic light probes allows providing more realistic lighting effects as changes to the environment are incorporated into the information stored in the light probes. However, this comes at a high computational cost as dynamic light probes need to be updated when the virtual environment changes, e.g. when objects move, or lighting conditions change (e.g. time of day changes). Thus, the process of generating and updating dynamic light probes can be computationally expensive.

Figure 4:
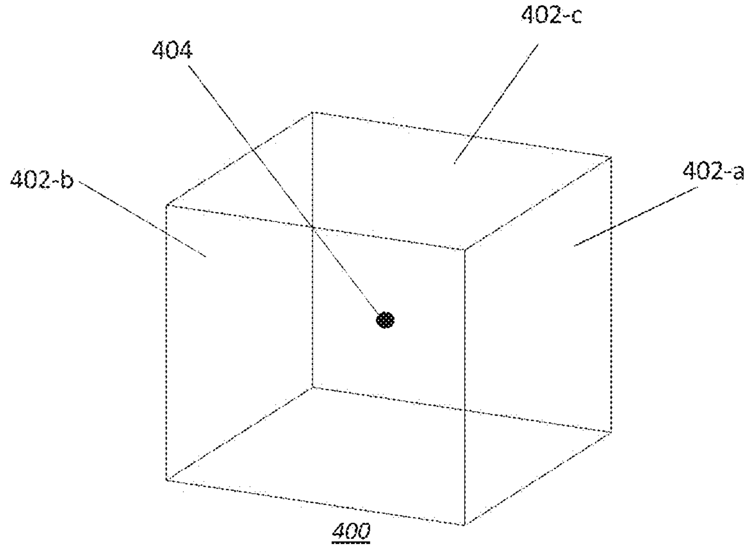
FIG. 4 schematically illustrates a light probe.

FIG. 4 schematically illustrates a non-limiting example of a light probe 400. The light probe 400 comprises faces 402 (e.g. faces 402-*a*, 402-*b*, 402-*c*), and a centre 404. The faces 402 represent the environment as viewed from the centre 404 of the probe. Each face 402 is divided into a grid of pixels (not shown). It will be appreciated that the faces 402 of the probe may represent textures. Thus, the "pixels" on the faces may be considered "texels". Further, while in the example shown in FIG. 4, the light probe 400 is shaped as a cube with six faces 402, it will be appreciated that the light probe may have other shapes such as a spherical shape.

Generating (or updating) a light probe may comprise environment mapping using faces of the light probe as the map shape. Environment mapping may comprise projecting the virtual environment onto the faces of the light probe and storing the resulting textures—in other words, rendering the virtual environment to faces of the light probe. For the example cube light probe 400, environment mapping may comprise cube mapping whereby the environment is projected onto the six faces 402 of the light probe 400. A cube map of the environment may thus be generated by rendering the virtual environment from the viewpoint of the centre 404 of the light probe for each light probe face 402. For the cube light probe 400, six virtual environment rendering operations may therefore be required to generate the light probe 400 or to update the light probe 400 (e.g. to account for movement of objects in the environment).

A large number of light probes is typically provided in a virtual environment, and for each light probe a separate rendering operation may be required for each face of the probe. It will therefore be appreciated that the process of generating and updating dynamic light probes in an environment can require a large number of rendering operations and can have a high associated computational cost.

The present approach allows reducing this computational cost and improving the efficiency of updating dynamic light probes. For a given light probe, the virtual camera position for rendering the environment to the light probe is defined by the centre and faces of the light probe. The virtual camera position therefore does not move between frames, and the static elements geometry can be re-used for each subsequent frame (provided the light probe itself hasn't been moved). Further, as the environment is rendered to the light probe faces from each viewing direction, the environment rendered to one or more face of the probe can comprise mostly static elements (e.g. at least the probe face facing the ground will typically comprise mostly static elements). Thus, caching and re-using the static elements geometry can provide significant efficiency improvements in updating light probes as it removes the need to repeatedly determine the geometry of the environment from scratch each time the light probe is updated.

Of course, the techniques described herein can be extended to the generation and updating of a plurality of light probes in one or more virtual environments.

Referring back to FIG. 2, in a summary embodiment of the present invention a method for rendering a virtual environment comprises the following steps.

A step 210 comprises identifying one or more static elements in the virtual environment, as described elsewhere herein.

A step 220 comprises determining, for a first frame having a first virtual camera position, a geometry of the static elements in the virtual environment, as described elsewhere herein.

A step 230 comprises storing the geometry of the static elements for the first frame, as described elsewhere herein.

A step 240 comprises determining, for a second frame having the first virtual camera position, a geometry of at least part of the virtual environment based, at least in part, on the stored geometry of the static elements for the first frame, as described elsewhere herein.

A step 250 comprises determining, for the second frame, lighting for the at least part of the virtual environment at least in part based on the geometry of the at least part of the virtual environment determined for the second frame, to render the at least part of the virtual environment, as described elsewhere herein.

It will be apparent to a person skilled in the art that variations in the above method corresponding to operation of the various embodiments of the method and/or apparatus as described and claimed herein are considered within the scope of the present disclosure, including but not limited to that:

the method is for generating a light probe in a virtual environment, and the at least part of the virtual environment is rendered to one or more faces of the light probe, as described elsewhere herein;

the method further comprises identifying one or more dynamic elements in the virtual environment, as described elsewhere herein;

in this case, optionally determining 240 the geometry of the at least part of the virtual environment for the second frame comprises: determining a geometry of the dynamic elements for the second frame, and combining the stored geometry of the static elements for the first frame and the determined geometry of the dynamic elements for the second frame, as described elsewhere herein;

where, optionally combining the stored geometry of the static elements and the determined geometry of the dynamic elements is in dependence on the relative depth, from the first virtual camera position, of the static and dynamic elements, as described elsewhere herein;

in this case, optionally the step 240 of determining geometry for the second frame is performed in dependence on detecting movement of at least one of the dynamic elements between the first frame and the second frame, as described elsewhere herein;

where, optionally the method further comprises determining a geometry of the at least part of the virtual environment for the first frame; where, upon detecting that the dynamic elements have not moved between the first frame and the second frame, determining 250 lighting for the second frame is at least partly based on the determined geometry of the at least part of the virtual environment for the first frame, as described elsewhere herein;

where, optionally the step 250 of determining lighting for the second frame is performed in dependence on detecting a change to at least one light source in the virtual environment between the first frame and the second frame, as described elsewhere herein;

where, optionally the method further comprises determining lighting for the at least part of the virtual environment for the first frame; wherein upon detecting that the light sources have not changed between the first frame and the second frame, determining 250 lighting for the second frame comprises re-using the lighting determined for the first frame, as described elsewhere herein;

determining 250 lighting for the at least part of the virtual environment for the second frame based on the determined geometry of the at least part of the virtual environment comprises: determining one or more output pixels for output to a display, and performing a lighting operation for each output pixel, as described elsewhere herein;

the method further comprises determining a virtual camera position for the second frame, and upon detecting that the second frame has a second, different, virtual camera position: determining, for the second frame, a geometry of the static elements in the virtual environment, and storing the geometry of the static elements for the second frame, as described elsewhere herein;

in this case, optionally determining and storing the geometry of the static elements for the second frame is performed in dependence on one or more predetermined conditions, the predetermined conditions relating to one or more selected from the list consisting of: to a proportion of static elements in the second frame, a frequency of the second virtual camera position amongst previous frames, or a flag assigned by a user to the second frame and/or the second virtual camera position, as described elsewhere herein;

the method further comprises removing the geometry of the static elements for the first frame from storage, as described elsewhere herein;

in this case, optionally removing the geometry of the static elements for the first frame from storage is performed in dependence on one or more predetermined conditions, the predetermined conditions relating to one or more selected from the list consisting of: a recency of the first frame, a game associated with the virtual environment, a frequency of the first virtual camera position amongst previous frames, or a flag assigned by a user to the first frame and/or the first virtual camera position, as described elsewhere herein;

the method further comprises: identifying one or more fixed elements in the virtual environment, a fixed element being fixed relative to a virtual camera irrespective of the position of the virtual camera; determining, for the first frame, a geometry of the fixed elements in the virtual environment; storing the geometry of the fixed elements for the first frame; and determining the geometry for the second frame at least partly based on the stored geometry of the fixed elements for the first frame, as described elsewhere herein;

in this case, optionally upon detecting that the second frame has a second, different, virtual camera position, determining the geometry for the second frame is at least partly based on the stored geometry of the fixed elements for the first frame, instead of the stored geometry of the static elements for the first frame, as described elsewhere herein;

the method further comprises selecting a frame amongst a plurality of frames as the first frame in dependence on one or more predetermined conditions, as described elsewhere herein; and in this case, optionally the one or more predetermined conditions comprise one or more selected from the list consisting of: a proportion of static elements in the plurality of frames, or a distribution of virtual camera positions amongst the plurality of frames, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 5:
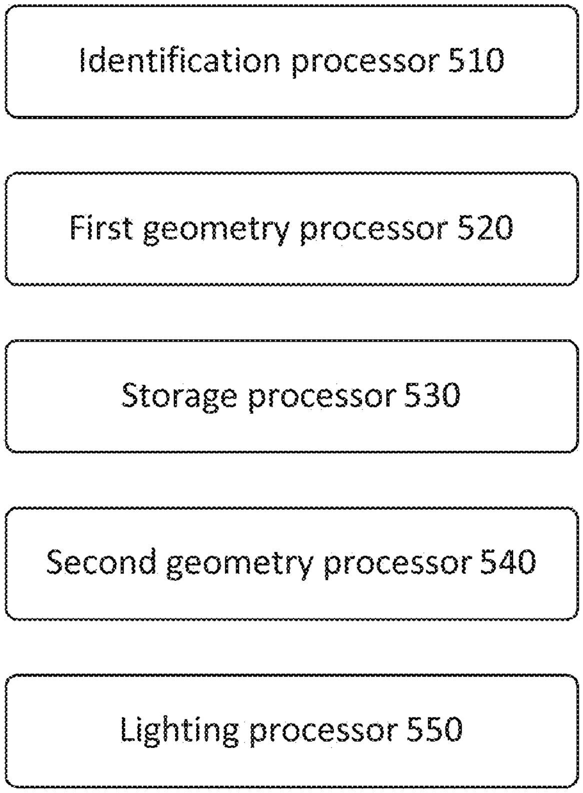
FIG. 5 schematically illustrates a system for rendering a virtual environment.

Referring to FIG. 5, in a summary embodiment of the present invention, a system for rendering a virtual environment may comprise the following:

An identification processor 510 configured (for example by suitable software instruction) to identify one or more static elements in the virtual environment, as described elsewhere herein.

A first geometry processor 520 configured (for example by suitable software instruction) to determine, for a first frame having a first virtual camera position, a geometry of the static elements in the virtual environment, as described elsewhere herein.

A storage processor 530 configured (for example by suitable software instruction) to store the geometry of the static elements for the first frame, as described elsewhere herein.

A second geometry processor 540 configured (for example by suitable software instruction) to determine, for a second frame having the first virtual camera position, a geometry of at least part of the virtual environment based, at least in part, on the stored geometry of the static elements for the first frame, as described elsewhere herein.

A lighting processor 550 configured (for example by suitable software instruction) to determine, for the second frame, lighting for the at least part of the virtual environment at least in part based on the geometry of the at least part of the virtual environment determined for the second frame, to render the at least part of the virtual environment, as described elsewhere herein.

These processors 510-550 may, for example, be implemented by the CPU 20 of the entertainment system 10. Of course, it will be appreciated that the functionality of these processors may be realised by any suitable number of processors located at any suitable number of devices and any suitable number of devices as appropriate rather than requiring a one-to-one mapping between the functionality and a device or processor.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for rendering a virtual environment, the method comprising:

identifying one or more static elements in the virtual environment;

determining, for a first frame having a first virtual camera position, a geometry of the static elements in the virtual environment;

storing the geometry of the static elements for the first frame;

determining, for a second frame having the first virtual camera position, a geometry of at least part of the virtual environment based, at least in part, on the stored geometry of the static elements for the first frame, comprising:

determining a geometry of dynamic elements for the second frame, and combining the stored geometry of the static elements for the first frame and the determined geometry of the dynamic elements for the second frame; and determining, for the second frame, lighting for the at least part of the virtual environment at least in part based on the geometry of the at least part of the virtual environment determined for the second frame, to render the at least part of the virtual environment.

2. The method of claim 1, wherein the method is for generating a light probe in a virtual environment, and wherein the at least part of the virtual environment is rendered to one or more faces of the light probe.

3. The method of claim 1, further comprising identifying one or more dynamic elements in the virtual environment.

4. The method of claim 1, wherein combining the stored geometry of the static elements and the determined geometry of the dynamic elements is in dependence on the relative depth, from the first virtual camera position, of the static and dynamic elements.

5. The method of claim 3, wherein the step of determining geometry for the second frame is performed in dependence on detecting movement of at least one of the dynamic elements between the first frame and the second frame.

6. The method of claim 5, further comprising determining a geometry of the at least part of the virtual environment for the first frame; wherein, upon detecting that the dynamic elements have not moved between the first frame and the second frame, determining lighting for the second frame is at least partly based on the determined geometry of the at least part of the virtual environment for the first frame.

7. The method of claim 6, wherein the step of determining lighting for the second frame is performed in dependence on detecting a change to at least one light source in the virtual environment between the first frame and the second frame.

8. The method of claim 7, further comprising determining lighting for the at least part of the virtual environment for the first frame; wherein upon detecting that the light sources have not changed between the first frame and the second frame, determining lighting for the second frame comprises re-using the lighting determined for the first frame.

9. The method of claim 1, wherein determining lighting for the at least part of the virtual environment for the second frame based on the determined geometry of the at least part of the virtual environment comprises: determining one or more output pixels for output to a display, and performing a lighting operation for each output pixel.

10. The method of claim 1, further comprising determining a virtual camera position for the second frame, and upon detecting that the second frame has a second, different, virtual camera position: determining, for the second frame, a geometry of the static elements in the virtual environment, and storing the geometry of the static elements for the second frame.

11. The method of claim 10, further comprising removing the geometry of the static elements for the first frame from storage.

12. The method of claim 1, further comprising:

identifying one or more fixed elements in the virtual environment, a fixed element being fixed relative to a virtual camera irrespective of the position of the virtual camera;

determining, for the first frame, a geometry of the fixed elements in the virtual environment;

storing the geometry of the fixed elements for the first frame; and determining the geometry for the second frame at least partly based on the stored geometry of the fixed elements for the first frame.

13. A non-transitory computer storage media encoded with computer program instructions that when executed by one or more computers cause the one or more computers to perform a method for rendering a virtual environment, the method comprising:

identifying one or more static elements in the virtual environment;

determining, for a first frame having a first virtual camera position, a geometry of the static elements in the virtual environment;

storing the geometry of the static elements for the first frame;

determining, for a second frame having the first virtual camera position, a geometry of at least part of the virtual environment based, at least in part, on the stored geometry of the static elements for the first frame, comprising:

determining a geometry of dynamic elements for the second frame, and combining the stored geometry of the static elements for the first frame and the determined geometry of the dynamic elements for the second frame; and determining, for the second frame, lighting for the at least part of the virtual environment at least in part based on the geometry of the at least part of the virtual environment determined for the second frame, to render the at least part of the virtual environment.

14. A system for rendering a virtual environment, the system comprising:

an identification processor configured to identify one or more static elements in the virtual environment;

a first geometry processor configured to determine, for a first frame having a first virtual camera position, a geometry of the static elements in the virtual environment;

a storage processor configured to store the geometry of the static elements for the first frame;

a second geometry processor configured to determine, for a second frame having the first virtual camera position, a geometry of at least part of the virtual environment based, at least in part, on the stored geometry of the static elements for the first frame, comprising:

determining a geometry of dynamic elements for the second frame, and combining the stored geometry of the static elements for the first frame and the determined geometry of the dynamic elements for the second frame; and a lighting processor configured to determine, for the second frame, lighting for the at least part of the virtual environment at least in part based on the geometry of the at least part of the virtual environment determined for the second frame, to render the at least part of the virtual environment.

* * * * *